(12) United States Patent
Fujiwara et al.

(10) Patent No.: US 8,664,568 B2
(45) Date of Patent: Mar. 4, 2014

(54) ARC WELDING CONTROL METHOD AND ARC WELDING APPARATUS

(75) Inventors: Junji Fujiwara, Osaka (JP); Atsuhiro Kawamoto, Osaka (JP); Akira Nakagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 494 days.

(21) Appl. No.: 11/911,387

(22) PCT Filed: Apr. 11, 2007

(86) PCT No.: PCT/JP2007/057964
§ 371 (c)(1),
(2), (4) Date: Oct. 12, 2007

(87) PCT Pub. No.: WO2008/047488
PCT Pub. Date: Apr. 24, 2008

(65) Prior Publication Data
US 2009/0289044 A1    Nov. 26, 2009

(30) Foreign Application Priority Data
Oct. 19, 2006    (JP) ................................ 2006-284538

(51) Int. Cl.
*B23K 33/00* (2006.01)

(52) U.S. Cl.
USPC .................. 219/137 R; 219/130.5; 219/125.1; 219/130.51; 219/137.71; 219/136

(58) Field of Classification Search
USPC .................. 219/125.1, 137.71, 60 A, 124.03, 219/125.11, 124.34, 130.32, 130.33, 130.4, 219/137 R, 136, 130.01–130.51
See application file for complete search history.

(56) References Cited

U.S. PATENT DOCUMENTS

| | | | |
|---|---|---|---|
| 5,225,654 A * | 7/1993 | Harwig et al. ........... | 219/121.46 |
| 6,600,135 B2 * | 7/2003 | Tong ........................ | 219/137 PS |
| 2004/0004113 A1* | 1/2004 | Blankenship ................. | 235/375 |
| 2004/0020907 A1* | 2/2004 | Zauner et al. ............ | 219/130.21 |
| 2006/0226131 A1* | 10/2006 | Stava et al. ................ | 219/130.33 |

FOREIGN PATENT DOCUMENTS

| | | | | |
|---|---|---|---|---|
| JP | 57-106472 A | | 7/1982 | |
| JP | 57106472 A | * | 7/1982 | ............... B23K 9/00 |
| JP | 58-132374 A | | 8/1983 | |
| JP | 01-107968 A | | 4/1989 | |
| JP | 2001-259838 A | | 9/2001 | |
| JP | 2003-145266 A | | 5/2003 | |
| JP | 2004-174523 A | | 6/2004 | |
| JP | 2004174523 A | * | 6/2004 | ............. B23K 9/095 |

OTHER PUBLICATIONS

JP1982106472ATRANS.pdf human translation.*
JP_2004174523_description.pdf machine translation with complete figures.*

(Continued)

*Primary Examiner* — Dana Ross
*Assistant Examiner* — Ket D Dang
(74) *Attorney, Agent, or Firm* — RatnerPrestia (57) ABSTRACT

An arc welding control method carries out weld with a welding current and a welding speed different from those at a steady welding period according to intrinsic resistivity of a weld wire or a base material at a welding start period and a welding end period, so as to obtain a satisfactory welding quality.

14 Claims, 8 Drawing Sheets

(56) References Cited

OTHER PUBLICATIONS

Japanese Search Report for Application No. PCT/JP2007/057964, dated Jul. 24, 2007.
English translation of Form PCT/ISA/210.
JP Office Action for 2007-540409, Nov. 9, 2010.
Japanese Office Action for Application No. 2007-540409, Jun. 7, 2011, Panasonic Corporation.
Chinese Office Action for 200780000169.5, Jul. 7, 2010.
Supplementary European Search Report for EP 07 74 1400, Apr. 12, 2013.

* cited by examiner

ARC WELDING CONTROL METHOD AND ARC WELDING APPARATUS

THIS APPLICATION IS A U.S. NATIONAL PHASE APPLICATION OF PCT INTERNATIONAL APPLICATION PCT/JP2007/057964.

TECHNICAL FIELD

The present invention relates to an arc welding control method and an arc welding apparatus which supply a weld wire as a consumable electrode and simultaneously carried out arc weld.

BACKGROUND ART

In conventional arc welding, when aluminum is welded, a welding voltage and a weld wire supply speed at a welding start period are set to be the same as those at a steady welding period. At a welding end period, in order to repress generation of a crater, the welding voltage is reduced from a level at the steady welding period to a crater processing level, and the supply speed of the weld wire is reduced according to the reduction in the welding voltage. As the conventional arc welding, arc welding in Patent Document 1, for example, is known.

Figure 8A:
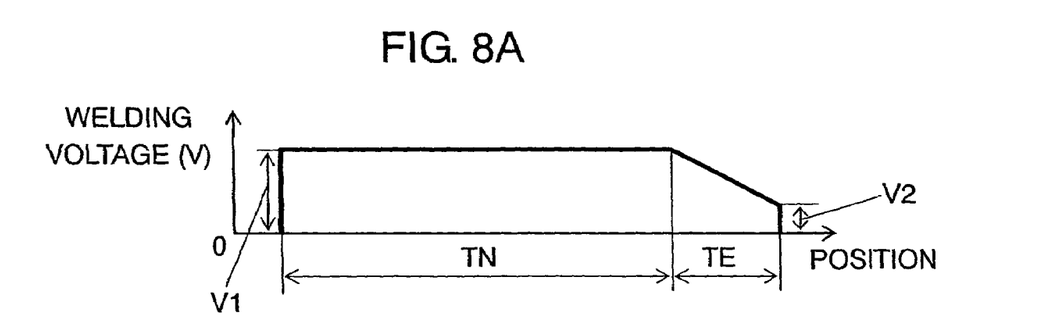
FIG. 8A is a diagram illustrating a change in a welding voltage with respect to a welding position in a conventional example.
Figure 8B:
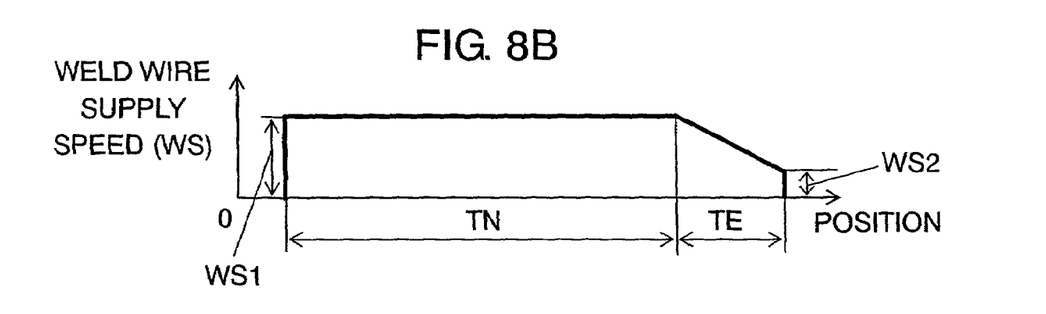
FIG. 8B is a diagram illustrating a change in a weld wire supply speed with respect to the welding position in the conventional example.
Figure 8C:
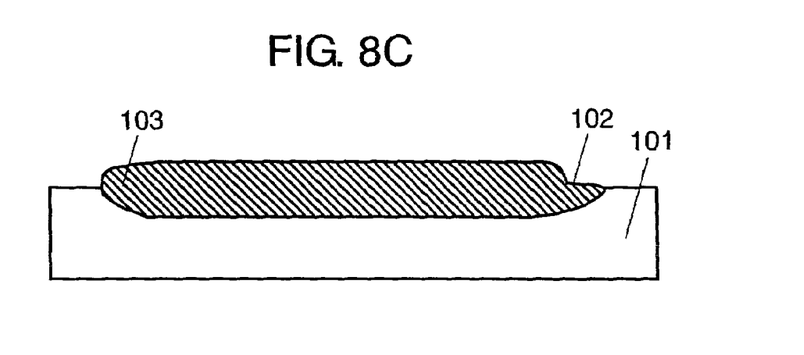
FIG. 8C is a diagram illustrating a welding state with respect to the welding position in the conventional example.

In the conventional arc welding, as shown in FIGS. 8A to 8C, since the welding voltage and the weld wire supply speed at welding start terminal portion 103 are the same as those at steady welding period TN, in the case where base material 101 with low intrinsic resistivity such as aluminum is welded, insufficient penetration occasionally occurs near welding start terminal portion 103 due to insufficient heat. A bead width is narrow, a bead height is high, and weld penetration is shallow, namely, a bead appearance does not have fitting of a bead.

The generation of crater 102 at a welding end portion can be reduced by controlling the welding voltage and the wire supply speed. However, only when welding voltage V1 and wire supply speed WS1 at steady welding period TN are adjusted so as to be welding voltage V2 and wire supply speed WS2 at a welding end point, occasionally crater 102 cannot be stably formed. This is because in the case where a weld wire is moved in a welding direction at end period TE at the same welding speed as that at steady welding period TN, if the weld wire supply speed is reduced from WS1 to WS2, a supply amount of the weld wire is reduced and the bead width becomes too thin. Therefore, a welding method which can secure a welding quality on a whole welding length from the welding start terminal portion to the end portion is desired.

Patent Document 1: Unexamined Japanese Patent Publication No. H1-107968

DISCLOSURE OF THE INVENTION

The present invention relates to an arc welding control method of welding by generating an arc between a weld wire and a base material, wherein the weld is carried out with a welding current and a welding speed which are different between a welding start period before a steady welding period and a welding end period after the steady welding period according to a material of the weld wire or a material of a base material. When the welding current and the welding speed are set suitably, the welding quality can be secured on a whole welding length from a welding start terminal portion to a welding end portion.

REFERENCE MARK AS IN THE DRAWINGS 3 switching element
7 output control section
8 welding condition control section
9 material setting section
10 robot control section
11 wire supply control section
12 manipulator
13 wire supply device
14 weld wire
15 welding torch
16 welding arc
17 base material
20 welder
21 robot
101 base material (material to be welded)

102 crater (welding end portion)
103 welding start terminal portion
TN steady welding period
TS welding start period
TE welding end period

PREFERRED EMBODIMENTS FOR CARRYING
OUT OF THE INVENTION

Embodiments of the present invention are described below with reference to FIGS. 1A to 7B. Arc welding effective for a material with low intrinsic resistivity such as aluminum is described in an embodiment 1, and arc welding effective for a material with high intrinsic resistivity such as iron or stainless is described in an embodiment 2.

(Embodiment 1)

An arc welding control method and an arc welding apparatus, which are effective for a material with low intrinsic resistivity such as aluminum, are described below with reference to FIGS. 1A to 5.

Figure 1A:
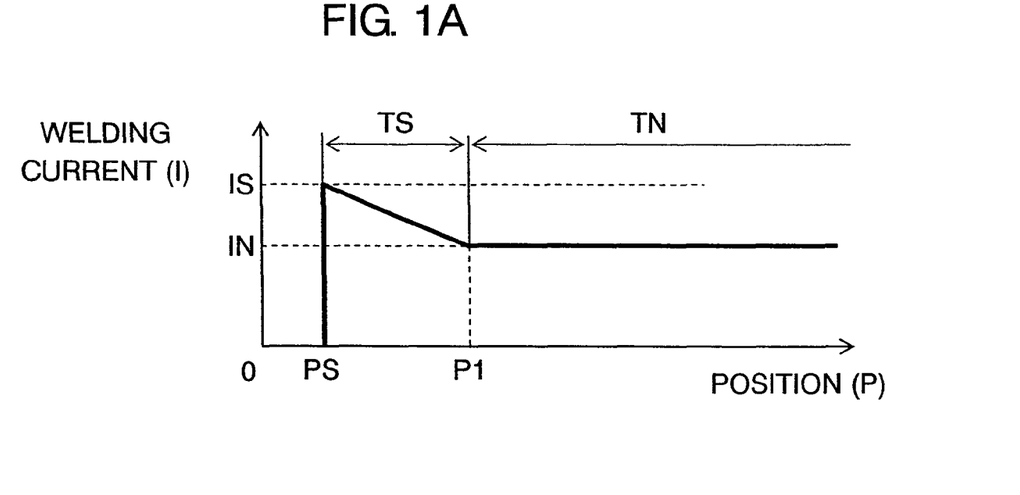
FIG. 1A is a diagram illustrating a change in a welding current with respect to a welding position in a control example 1 of an embodiment 1.
Figure 1B:
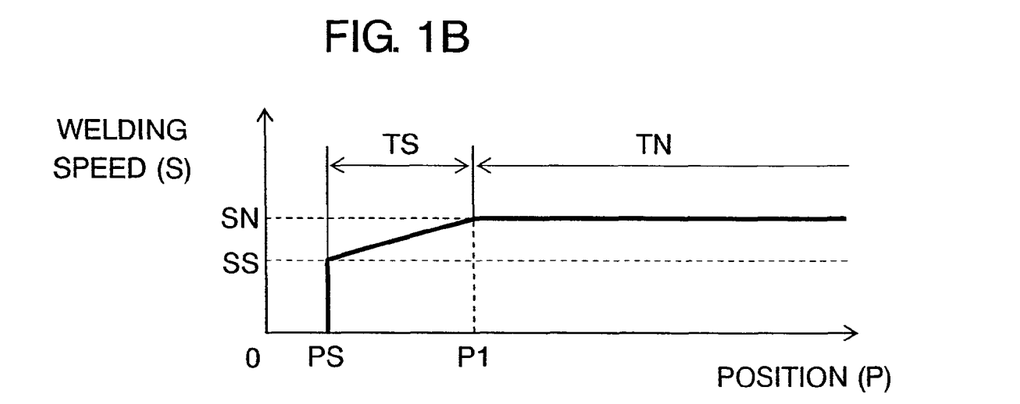
FIG. 1B is a diagram illustrating a change in a welding speed with respect to the welding position in the control example 1 of the embodiment 1.

FIGS. 1A and 1B illustrate changes in a welding current and a welding speed with respect to a welding position.

In FIGS. 1A and 1B, welding is started at welding start position PS. A welding current at welding start period TS from welding start position PS to welding position P1 is controlled so as to be higher than welding current IN at steady welding period TN. Further, a welding speed (a moving speed of a weld wire in a welding direction) is controlled at welding start period TS so as to be lower than welding speed SN at steady welding period TN.

As shown in FIGS. 1A and 1B, the welding current is set to value IS higher than IN on welding start position PS. The welding current is controlled so as to be gradually reduced from IS to IN at a constant rate within welding start period TS. Further, the welding speed is set to value SS lower than SN on welding start position PS. The welding speed is controlled so as to be gradually increased from SS to SN at a constant rate within the welding start period TS. When the welding speed is gradually increased, a welding state becomes more constant than the case where it is rapidly increased, thereby improving a bead appearance. Changing rates of the welding current and the welding speed are determined suitably according to a state of a base material, welding conditions and the like.

When the welding current and the welding speed are controlled at welding start period TS, a heat can be rapidly input into the base material mainly containing aluminum. Therefore, the base material is heated, and fusion of the base material proceeds so that sufficient penetration can be obtained. When the melting position reaches P1 at which steady welding period TN starts, the heat has been sufficiently input into the base material, and in a state that the penetration is stable, the welding current becomes IN and the welding speed becomes SN.

When the base material mainly containing aluminum is welded, since the aluminum has low intrinsic resistivity and good heat conductance and thus a heat is easily lost, a bead whose width is narrow, whose height is high, whose penetration is shallow and whose fitting is not good is formed by the conventional control method. However, according to the arc welding control method of the first embodiment, the heat can be rapidly input into the base material at the welding start portion, and thus a bead whose width is wide, whose height is low, whose penetration is deep and whose fitting is good can be securely formed.

When a welding voltage is controlled in addition to the control of the welding current and the welding speed, more satisfactory bead appearance can be obtained. To be more specific, the welding voltage is controlled so that an arc length according to the welding current is maintained, and thus the satisfactory bead appearance is obtained. Since the control of the welding voltage widens a margin of heat input adjustment with respect to a bead forming state and the welding state, a welding quality can be improved.

Figure 2A:
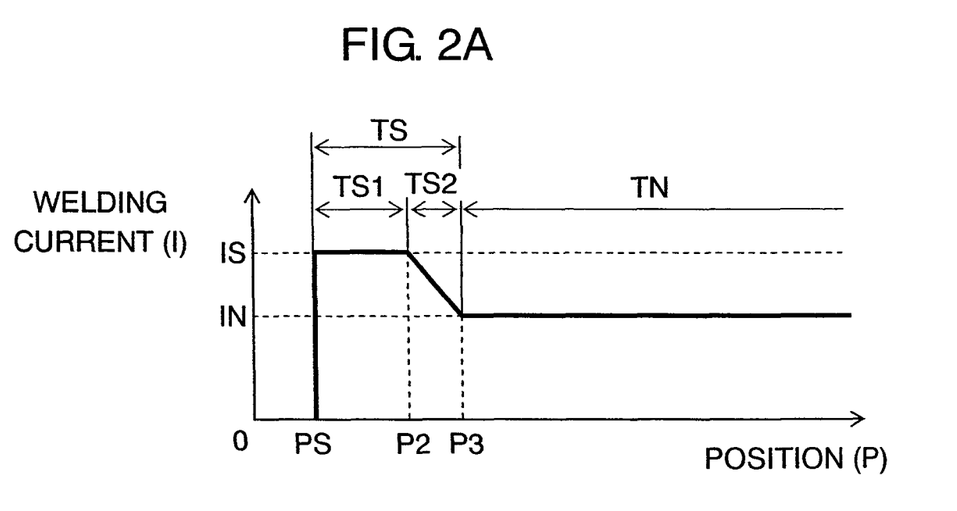
FIG. 2A is a diagram illustrating a change in the welding current with respect to the welding position in a control example 2 of the embodiment 1.
Figure 2B:
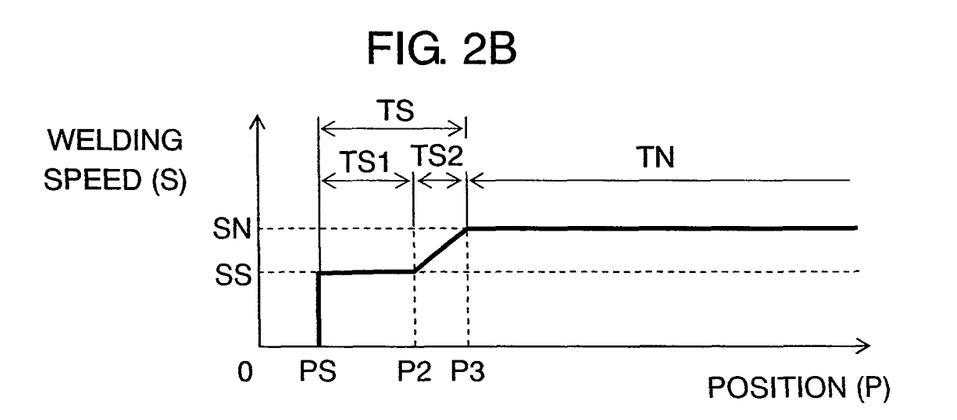
FIG. 2B is a diagram illustrating a change in the welding speed with respect to the welding position in the control example 2 of the embodiment 1.

Examples of the control of the welding current and the welding speed different from those in FIGS. 1A and 1B at the welding start period are described below with reference to FIGS. 2A and 2B. FIGS. 2A and 2B illustrate changes in the welding current and the welding speed with respect to the welding position, respectively.

As shown in FIGS. 2A and 2B, welding start period TS is divided into period TS1 from welding start position PS to welding position P2 and period TS2 from welding position P2 to welding position P3. The welding current is controlled so that welding current IS higher than welding current IN at steady welding period TN is kept constant at period TS1, and is controlled so as to be gradually reduced from IS to IN at a constant rate at period TS2. The welding speed is controlled so that welding speed SS lower than welding speed SN at steady welding period TN is kept constant at period TS1, and is controlled so as to be gradually increased from SS to SN at a constant rate at period TS2.

With the above control, since a heat can be input into the base material more rapidly than the case shown in FIGS. 1A and 1B, the base material is heated, and the fusion of the base material proceeds, so that the sufficient penetration can be obtained. As a result, the bead having a satisfactory appearance is obtained on the welding start terminal portion.

When the welding position reaches P3 at which steady welding period TN starts, the heat has been sufficiently input into the base material, and in the state where the penetration is stable, the welding current becomes IN and the welding speed becomes SN.

In addition to the control of the welding current and the welding speed, the control of the welding voltage is enabled similarly to the case shown in FIGS. 1A and 1B.

Figure 3A:
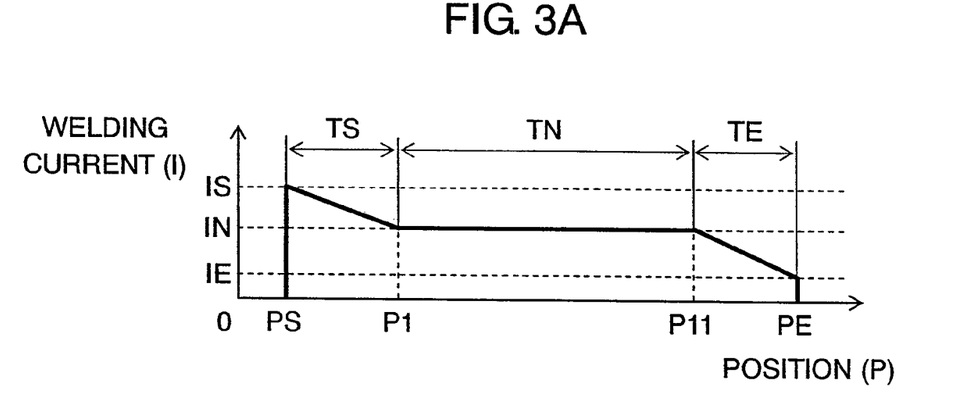
FIG. 3A is a diagram illustrating a change in the welding current with respect to the welding position in a control example 3 of the embodiment 1.
Figure 3B:
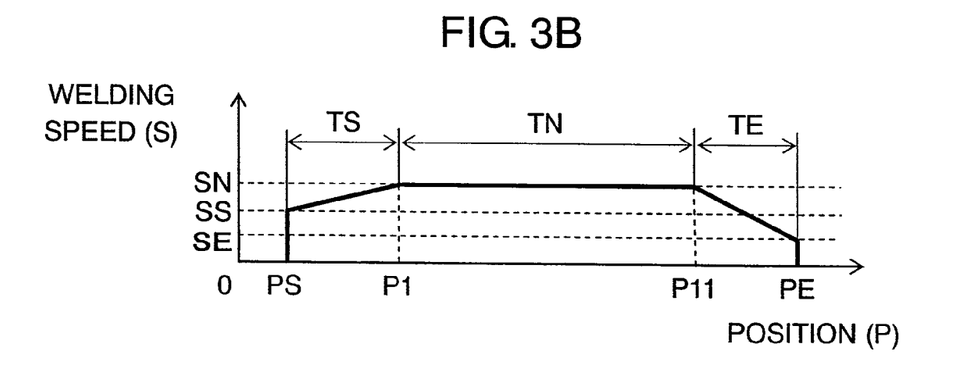
FIG. 3B is a diagram illustrating a change in the welding speed with respect to the welding position in the control example 3 of the embodiment 1.

Examples of the control of the welding current and the welding speed are described below with reference to FIGS. 3A and 3B. FIGS. 3A and 3B illustrate changes in the welding current and the welding speed with respect to the welding position, respectively. Since the control from welding start positions PS to P11 is similar to that shown in FIGS. 1A and 1B, the description thereof is omitted.

As shown in FIGS. 3A and 3B, at welding end period TE from welding position P11 to welding end position PE, the welding current is controlled so as to be gradually reduced at a constant rate to be welding current IE lower than welding current IN at steady welding period TN. The welding speed is controlled at welding end period TE so as to be gradually reduced at a constant rate to be welding speed SE lower than welding speed SN at steady welding period TN.

With the above control, the heat input into the base material is gradually reduced, and the bead width equivalent to that at steady welding period TN is maintained, and simultaneously the penetration is made to be shallow, so that digging on a center portion of the crater can be repressed.

In addition to the control of the welding current and the welding speed, the control of the welding voltage is enabled similarly to the case shown in FIGS. 1A and 1B.

Figure 4A:
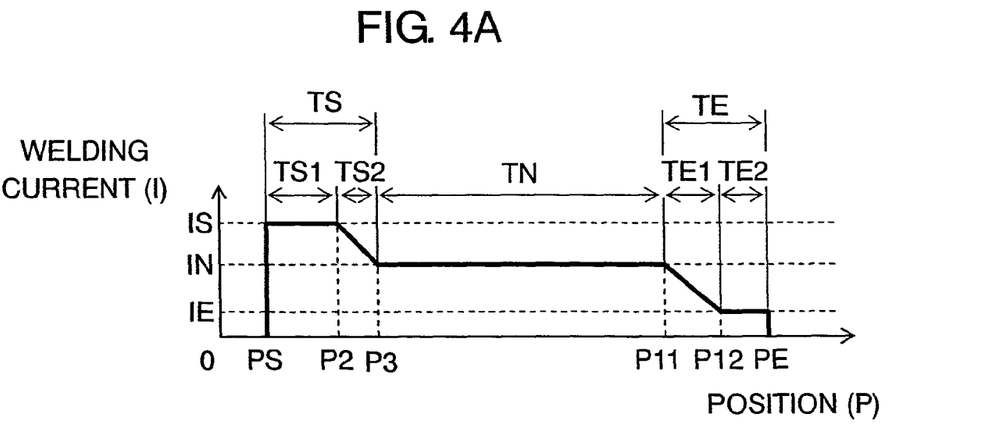
FIG. 4A is a diagram illustrating a change in the welding current with respect to the welding position in a control example 4 of the embodiment 1.
Figure 4B:
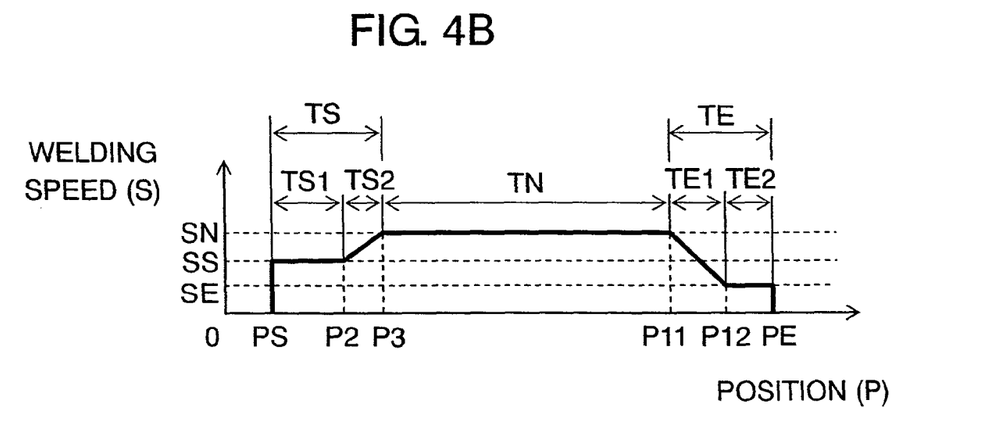
FIG. 4B is a diagram illustrating a change in the welding speed with respect to the welding position in the control example 4 of the embodiment 1.

Examples of the control of the welding current and the welding speed from welding start position PS to welding end position PE are described with reference to FIGS. 4A and 4B. FIGS. 4A and 4B illustrate changes in the welding current and the welding speed with respect to the welding position, respectively. Since the control from welding start position PS to welding position P11 is similar to that shown in FIGS. 2A and 2B, the description thereof is omitted.

As shown in FIGS. 4A and 4B, welding end period TE from welding position P11 to welding end position PE is divided into period TE1 from welding position P11 to welding position P12 and period TE2 from welding position P12 to welding end position PE. The welding current is controlled so as to be gradually reduced at a constant rate from welding current IN at steady welding period TN to welding current IE lower than IN at period TE1, and is controlled so that welding current IE is kept constant at period TE2.

The welding speed is controlled so as to be gradually reduced at a constant rate from welding speed SN at steady welding period TN to welding speed SE lower than SN at period TE1, and is controlled so that welding speed SE is kept constant at period TE2.

With the above control, since the heat input into the base material is sufficiently reduced and the welding can be ended, the bead width equivalent to that at steady welding period TN is maintained and simultaneously the penetration is made to be shallow, so that the digging on the center portion of the crater can be repressed.

In addition to the control of the welding current and the welding speed, the control of the welding voltage is enabled similarly to the case shown in FIGS. 1A and 1B.

Figure 5:
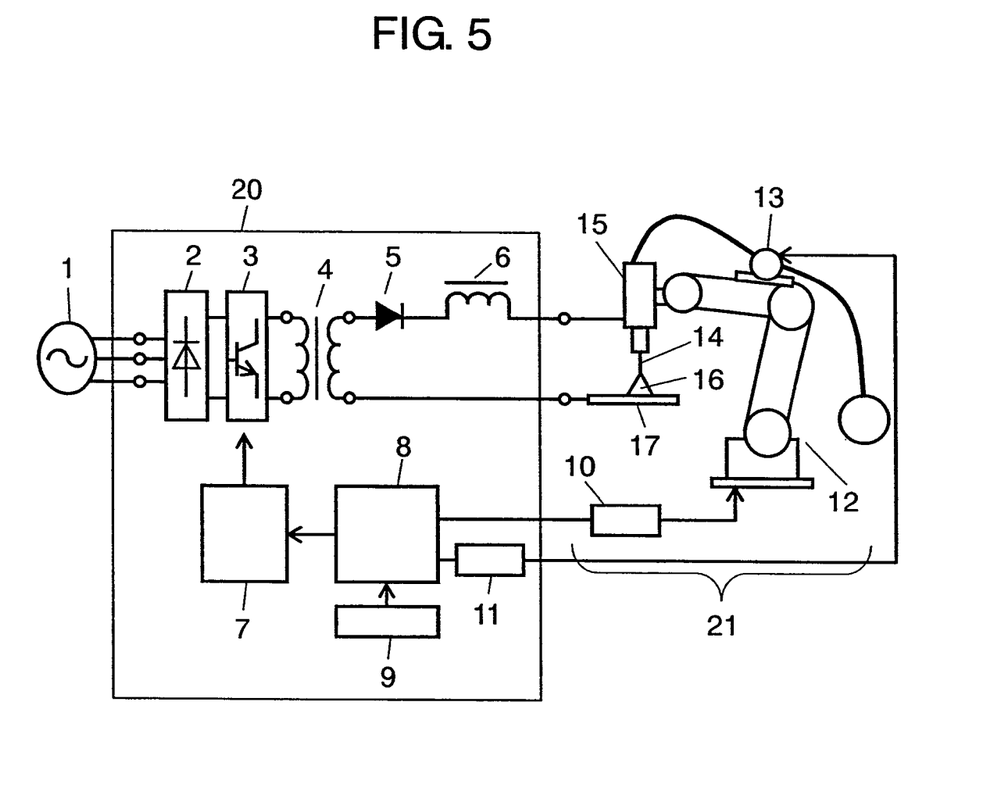
FIG. 5 is a diagram illustrating a schematic constitution of an arc welding apparatus according to the embodiment 1 and an embodiment 2 of the present invention.

FIG. 5 illustrates a constitution of an arc welding apparatus to be used in the embodiment 1 and an embodiment 2 of the present invention. The arc welding apparatus mainly includes welder 20 and robot 21.

In welder 20, an electric power from input power source 1 is rectified by primary rectifying section 2, is converted into an alternate current by switching element 3, is dropped by transformer 4, is rectified by secondary rectifying section 5 and inductor (DCL) 6, and is applied between weld wire 14 and base material 17. Welder 20 has output control section 7 which controls switching element 3, welding condition control section 8 which outputs a control signal to output control section 7, material setting section 9 which sets a material of weld wire 14 or a material of base material 17, and wire supply control section 11 which controls wire supply device 13. As the weld wire, a weld wire whose material is the same as base material 17 is used.

Robot 21 is mainly composed of manipulator 12 and robot control section 10. Manipulator 12 is provided with wire supply device 13 and welding torch 15.

Material setting section 9 sets a material of base material 17, and outputs a signal corresponding to the set material to welding condition control section 8. Welding condition control section 8 outputs a signal for controlling the welding current at welding start period TS set for each material in advance based on the signal, a signal for controlling the welding current at steady welding period TN and a signal for controlling the welding current at welding end period TE to output control section 7. Output control section 7 controls switching element 3 based on the signals from welding condition control section 8 so as to control the welding current.

Welding condition control section 8 outputs a signal for controlling the welding speed at welding start period TS set for each material in advance, a signal for controlling the welding speed at steady welding period TN and a signal for controlling the welding speed at welding end period TE to robot control section 10 based on the signal from material quality setting section 9. Robot control section 10 controls manipulator 12 based on the signals from welding condition control section 8 so as to control the welding speed in a welding direction of base material 17, namely, a moving speed in a welding direction of weld wire 14.

Further, welding condition control section 8 outputs a signal for controlling the supply speed of weld wire 14 in an integrated relationship with the welding current to wire supply control section 11, and wire supply control section 11 controls wire supply device 13 based on the signal from welding condition control section 8 so as to control the supply speed of weld wire 14.

For example, when material setting section 9 sets a material which mainly contains aluminum as the material of weld wire 14 or the material of base material 17, the welding current and the welding speed are controlled as shown in FIGS. 1A and 1B, 2A and 2B, 3A and 3B, or 4A and 4B.

The components composing the arc welding device shown in FIG. 5 may be arranged independently or a plurality of components may be arranged compositively. In the arc welding device shown in FIG. 5, material setting section 9 may be constituted so as to be capable of selecting the material mainly containing aluminum or the material mainly containing iron or stainless.

According to the arc welding control method and the arc welding control device of the embodiment 1, for example, when overlapping fillet weld or horizontal fillet weld is carried out, arc weld is carried out at welding start period TS and/or welding end period TE with the welding current and the welding speed different from welding current IN and welding speed SN at steady welding period TN according to the intrinsic resistivity of the material of weld wire 14 or the material of base material 17. As a result, a uniform welding quality can be realized on the whole welding length from the welding start terminal portion to the welding end portion.

FIGS. 2A, 2B, 4A and 4B illustrate the examples that the welding current and the welding speed are made to be constant at period TS1 of the welding start period, but the welding current and the welding speed may be controlled so as to be kept constant until weld is carried out a predetermined length from the weld start position or until predetermined time elapses from the start of the weld.

FIGS. 4A and 4B illustrate the examples that the welding current and the welding speed are controlled constantly at period TE2 of the welding end period, but the welding current and the welding speed may be controlled so as to be kept constant for a period for which the predetermined welding length to welding end position PE is welded, or for predetermined time for which the welding reaches welding end position PE.

The first embodiment describes the example where the welding current and the welding speed are controlled so as to change at a constant rate, namely, change in a linear pattern, but the change is not limited to linear pattern, and they may be controlled so as to change in a curved line pattern, or a linear pattern with a inflexion point or a curved line pattern with a inflection point.

(Embodiment 2)

The arc welding which is effective for a material with high intrinsic resistivity such as iron or stainless is described below with reference to FIGS. 6A to 7B. In an embodiment 2, the same parts as those in the embodiment 1 are denoted by the same reference numerals, and the detailed description thereof is omitted.

Figure 6A:
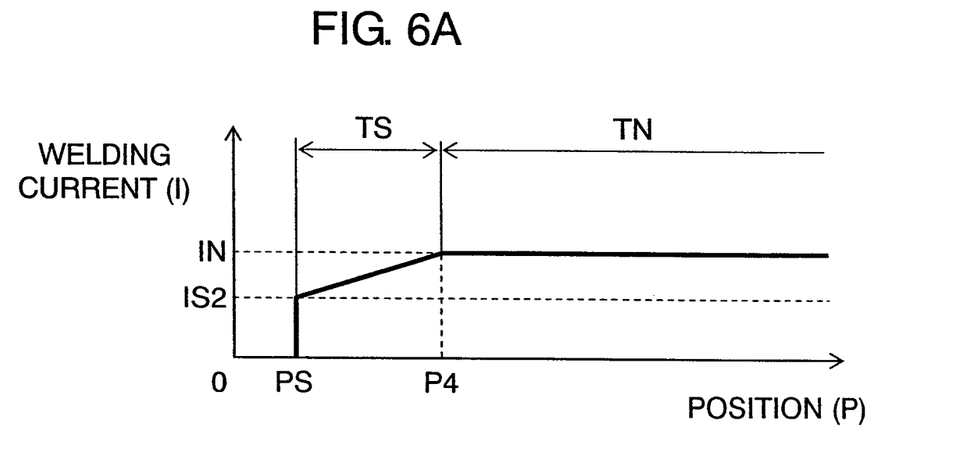
FIG. 6A is a diagram illustrating a change in the welding current with respect to the welding position in a control example of the embodiment 2.
Figure 6B:
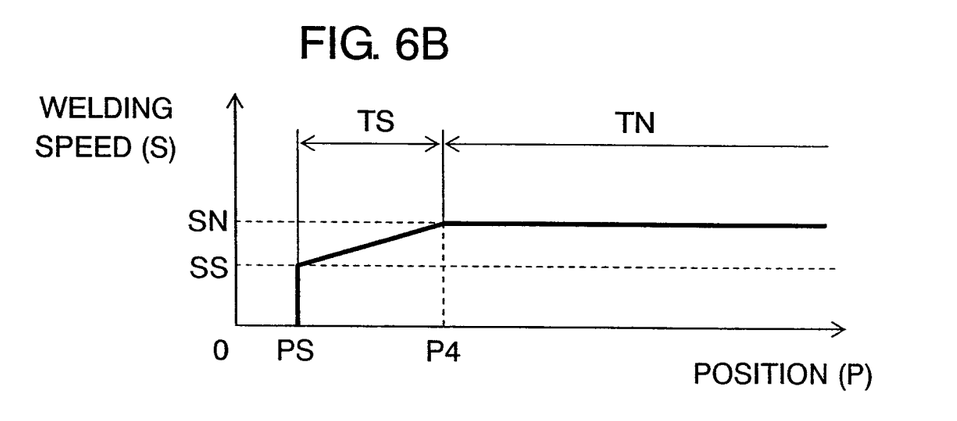
FIG. 6B is a diagram illustrating a change in the welding speed with respect to the welding position in the control example of the embodiment 2.

FIGS. 6A and 6B illustrate changes in the welding current and the welding speed with respect to the welding position. In FIGS. 6A and 6B, the weld starts on welding start position PS. The welding current is controlled at welding start period TS from welding start position PS to welding position P4 so as to be lower than welding current IN at steady welding period TN. Further, the welding speed is controlled at welding start period TS so as to be lower than welding speed SN at steady welding period TN.

As shown in FIGS. 6A and 6B, the welding current is set to value IS2 lower than IN on welding start position PS. The welding current is controlled so as to be gradually increased from IS2 to IN at a constant rate within welding start period TS. The welding speed is set to value SS lower than SN on welding start position PS. The welding speed is controlled so as to be gradually increased from SS to SN at a constant rate within welding start period TS. When the welding speed is gradually increased, the welding state is more stable than the case where the welding speed is rapidly increased, thereby providing a good bead appearance.

When the welding current and the welding speed are controlled in the above manner at welding start period TS, a heat can be gradually input into the base material mainly containing iron or stainless, and the base material is gradually heated, so that the suitable penetration can be obtained. When the welding position reaches welding position P4, the heat has been suitably input into the base material, and the welding current becomes IN and the welding speed becomes SN in the state that the penetration is stable. The heat can be suitably input into the base material at the time of the start of the welding, so that uniformity of the bead width can be stably secured.

Since melted metal is easily drawn to a place where the heat input is high, in the conventional control method, a heat is input into the base material excessively on welding start position PS, and the melted metal at steady welding period TN is drawn in a direction of welding start position PS. As a result, the bead width near the welding start terminal portion becomes wide and the bead on the starting portion of steady welding period TN becomes thin, namely, a constricted bead shape is formed. However, according to the arc welding control method in the embodiment 2, the heat can be suitably input into the base material on the welding start portion, and the melted metal at steady welding period TN is hardly drawn in the direction of welding start position PS, thereby stably securing the uniformity of the bead width.

In addition to the control of the welding current and the welding speed, the control of the welding voltage is enabled similarly to the embodiment 1.

Figure 7A:
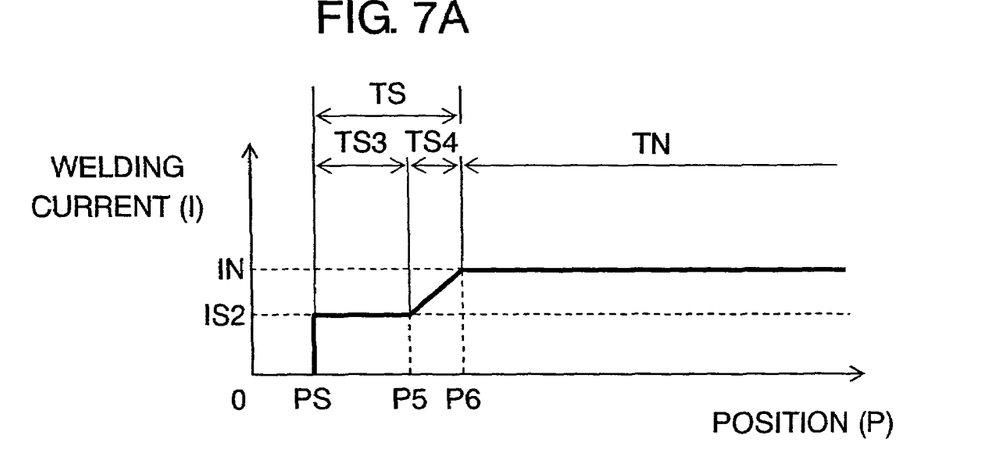
FIG. 7A is a diagram illustrating a change in the welding current with respect to the welding position in another control example of the embodiment 2.
Figure 7B:
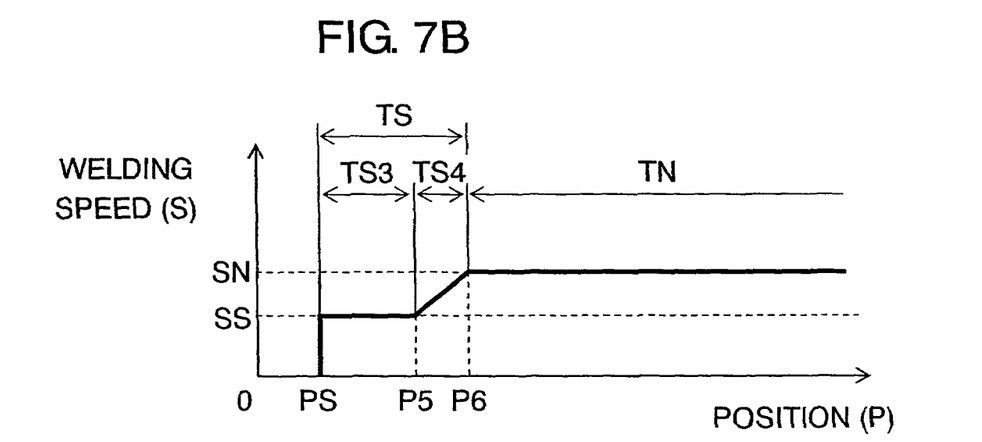
FIG. 7B is a diagram illustrating a change in the welding speed with respect to the welding position in another control example of the embodiment 2.

Examples of the control of the welding current and the welding speed shown in FIGS. 7A and 7B are described below. FIGS. 7A and 7B illustrate changes in the welding current and the welding speed with respect to the welding position.

As shown in FIGS. 7A and 7B, welding start period TS is divided into period TS3 from welding start position PS to welding position P5 and period TS4 from welding position P5 to welding position P6. The welding current is controlled so that welding current IS2 lower than welding current IN at steady welding period TN is kept constant at period TS3, and is controlled so as to be gradually increased from IS2 to IN at a constant rate at period TS4. The welding speed is controlled so that welding speed SS lower than welding current IN at steady welding period TN is kept constant at period TS3, and is controlled so as to be gradually increased from SS to SN at a constant rate at period TS4. With such control, the heat can be input gradually, the base material is heated slowly, and the penetration, which is more suitable than the case shown in FIGS. 6A and 6B, can be obtained. When the welding position reaches welding position P6, the heat has been suitably input into the base material, and the welding current becomes IN and the welding speed becomes SN in the state that the penetration is stable. In such a manner, the heat can be suitably input into the base material at the time of the start of the welding, and the uniformity of the bead width can be stably secured. In addition to the control of the welding current and the welding speed, the control of the welding voltage is enabled similarly to the embodiment 1.

The welding current and the welding speed can be controlled at the welding end period similarly to the embodiment 1.

Industrial Applicability

Since the arc welding control method and the arc welding apparatus of the present invention can realize the uniform welding quality, they are effective in an industrial field.

The invention claimed is:

1. An arc welding control method of welding by generating an arc between a weld wire and a base material, comprising:
   carrying out the weld at a welding start period before a steady welding period and at a welding end period after the steady welding period with a welding current and a welding speed different from those at the steady welding period according to a material of the weld wire or a material of the base material, wherein the material of the weld wire or the material of the base material is mainly aluminum,
   wherein, at the welding start period, the welding current is controlled so as to be higher than a welding current at the steady welding period, and the welding speed is controlled so as to be lower than a welding speed at the steady welding period, and
   the welding current is controlled to ramp down to the welding current in the steady welding period for at least a portion of the welding start period.

2. The arc welding control method according to claim 1, wherein within the welding start period, a welding current on a welding start position which is higher than the welding current at the steady welding period is controlled so as to be reduced towards the welding current at the steady welding period, and a welding speed on the welding start position which is lower than the welding speed at the steady welding period is controlled so as to be increased towards the welding speed at the steady welding period.

3. The arc welding control method according to claim 1, wherein within the welding start period, a welding current on a welding start position which is higher than the welding current at the steady welding period is kept constant and then is controlled so as to be reduced towards the welding current at the steady welding period, and a welding speed on the welding start position which is lower than the welding speed at the steady welding period is kept constant and then is controlled so as to be increased towards the welding speed at the steady welding period.

4. The arc welding control method according to claim 3, wherein within the welding start period, the welding current and the welding speed are controlled so as to be kept constant from the welding start position to a predetermined welding position within the welding start period, or from the welding start position until welding a predetermined length within the welding start period, or from start of the welding until elapsing predetermined time within the welding start period.

5. The arc welding control method according to claim 1, wherein within the welding end period, the welding current is controlled so as to be lower than the welding current at the steady welding period, and the welding speed is controlled so as to be lower than the welding speed at the steady welding period.

6. The arc welding control method according to claim 5, wherein at the welding end period, the welding current is controlled so as to be reduced from the welding current at the steady welding period towards a welding current on a welding end position of the welding end period, and the welding speed is controlled so as to be reduced from the welding speed at the steady welding period towards a welding speed on a welding end position of the welding end period.

7. The arc welding control method according to claim 5, wherein at the welding end period, the welding current is controlled from an end position of the steady welding period to a predetermined welding position within the welding end period so as to be reduced from the welding current at the steady welding period towards a welding current on a welding end position of the welding end period, and the welding current on the welding end position of the welding end period is controlled so as to be kept constant from the predetermined welding position within the welding end period to the welding end position of the welding end period, the welding speed is controlled from the end position of the steady welding period to the predetermined welding position within the welding end period so as to be reduced from the welding speed at the steady welding period towards a welding speed on the welding end position of the welding end period, and the welding speed on the welding end position of the welding end period is controlled to be maintained from the predetermined welding position within the welding end period to the welding end position of the welding end period.

8. The arc welding control method according to claim 5, wherein at the welding end period, the welding current and the welding speed are kept constant for a period for which a predetermined length is welded within the welding end period to a welding end position of the welding end period or for a predetermined time within the welding end period to the welding end position of the welding end period.

9. An arc welding control method of welding by generating an arc between a weld wire and a base material comprising:
carrying out the weld at a welding start period before a steady welding period and at a welding end period after the steady welding period with a welding current and a welding speed different from those at the steady welding period according to a material of the weld wire or a material of the base material, wherein the material of the weld wire or the material of the base material is mainly one of iron or stainless,
wherein the welding current is controlled at the welding start period so as to be lower than a welding current at the steady welding period, and the welding speed is controlled so as to be lower than a welding speed at the steady welding period, and within the welding start period, the welding current and the welding speed are controlled so as to be kept constant from the welding start position to either a predetermined welding position within the welding start period, a predetermined length within the welding start period, or a predetermined time within the welding start period.

10. The arc welding control method according to claim 9, wherein within the welding start period, a welding current on a welding start position which is lower than the welding current at the steady welding period is controlled so as to be increased towards the welding current at the steady welding period, and a welding speed on the welding start position which is lower than the welding speed at the steady welding period is controlled so as to be increased towards the welding speed at the steady welding period.

11. The arc welding control method according to claim 9, wherein within the welding start period, a welding current on a welding start position which is lower than the welding current at the steady welding period is kept constant and then is controlled so as to be increased towards the welding current at the steady welding period, and a welding speed on the welding start position which is lower than the welding speed at the steady welding period is kept constant and then is controlled so as to be increased towards the welding speed at the steady welding period.

12. The arc welding control method according to claim 9, wherein within the welding end period, the welding current is controlled so as to be lower than the welding current at the steady welding period, and the welding speed is controlled so as to be lower than the welding speed at the steady welding period.

13. The arc welding control method according to claim 12, wherein at the welding end period, the welding current is controlled so as to be reduced from the welding current at the steady welding period towards a welding current on a welding end position of the welding end period, and the welding speed is controlled so as to be reduced from the welding speed at the steady welding period towards a welding speed on a welding end position of the welding end period.

14. The arc welding control method according to claim 12, wherein at the welding end period, the welding current and the welding speed are kept constant for a period for which a predetermined length is welded within the welding end period to a welding end position of the welding end period or for a predetermined time within the welding end period to the welding end position of the welding end period.

\* \* \* \* \*